(12) United States Patent
Strittmatter

(10) Patent No.: US 6,937,134 B2
(45) Date of Patent: Aug. 30, 2005

(54) RECEPTION OF PROTECTION COMMANDS IN A REMOTE TRIPPING DEVICE

(75) Inventor: Michael Strittmatter, Zurzach (CH)

(73) Assignee: ABB Schweiz AG (CH)

( * ) Notice: Subject to any disclaimer, the term of this patent is extended or adjusted under 35 U.S.C. 154(b) by 380 days.

(21) Appl. No.: 10/358,208

(22) Filed: Feb. 5, 2003

(65) Prior Publication Data

US 2003/0156369 A1 Aug. 21, 2003

(30) Foreign Application Priority Data

Feb. 12, 2002 (EP) .............................. 02405106

(51) Int. Cl.⁷ .......................... G05B 23/02; H02H 3/00
(52) U.S. Cl. ...................... 340/3.22; 340/3.8; 340/644; 361/62; 361/66; 361/68
(58) Field of Search ................................ 340/3.22, 3.8, 340/644; 361/62, 66, 68, 69, 154, 182; 307/129; 700/291; 200/50; 370/242, 419

(56) References Cited

U.S. PATENT DOCUMENTS

| | | | |
|---|---|---|---|
| 4,203,142 A | | 5/1980 | Lee |
| 5,038,246 A | * | 8/1991 | Durivage, III .............. 361/93.2 |
| 5,220,479 A | * | 6/1993 | Fraisse .......................... 361/97 |
| 5,524,083 A | * | 6/1996 | Horne et al. ................. 700/293 |
| 5,793,750 A | * | 8/1998 | Schweitzer, III et al. ... 370/242 |
| 5,875,087 A | * | 2/1999 | Spencer et al. ................ 361/87 |
| 6,067,218 A | * | 5/2000 | Suptitz ......................... 361/97 |
| 6,141,202 A | * | 10/2000 | Maeckel et al. ............. 361/187 |

* cited by examiner

Primary Examiner—Michael Horabik
Assistant Examiner—Nam Nguyen
(74) Attorney, Agent, or Firm—Burns, Doane, Swecker & Mathis LLP

(57) ABSTRACT

In order to receive protection commands in a remote tripping device, one or more signals is or are received, protection commands and combinations of protection commands are coded by means of an individual signal or by means of a predetermined combination of signals, and each protection command is allocated a predetermined minimum safety and/or security value. In this case, each signal is allocated a detector (41, 42, 43, 44, 45) which detects the presence of the signal on the basis of at least two different safety and/or security values which can be predetermined, and a protection command is detected with an allocated minimum safety and/or security value if an individual signal, which codes the protection command individually or in conjunction with other protection commands, is detected with a safety and/or security threshold value which is greater than or equal to the minimum safety and/or security value allocated to that protection command, or if all the signals in a combination of signals which codes the protection command individually or in conjunction with other protection commands are in each detected with a safety and/or security threshold value which is greater than or equal to the minimum safety and/or security value allocated to the protection command.

8 Claims, 2 Drawing Sheets

RECEPTION OF PROTECTION COMMANDS IN A REMOTE TRIPPING DEVICE

FIELD OF THE INVENTION

The invention relates to the field of protection technology for high-voltage and medium-voltage networks. It relates to methods for reception of protection commands in a remote tripping device, and to a remote tripping device as claimed in the precharacterizing clause of patent claims 1 and 8.

BACKGROUND OF THE INVENTION

Remote tripping devices or protection signal transmission devices are used for transmitting protection or switching commands for distance protection in electrical high-voltage and medium-voltage networks and systems. Protection commands result, for example, in a circuit breaker being opened directly or indirectly and, in consequence in electrical disconnection of a part of the network or of the system. Conversely, other protection commands result in opening of a circuit breaker being prevented. Protection commands must be transmitted, for example, from one section of a high-voltage line to another. To do this, a transmitter in a remote tripping device produces analog signals in accordance with the protection commands, which analog signals are transmitted via a signal link. A receiver in another remote tripping device detects the transmitted signals and determines the corresponding number and nature of the protection commands.

The analog signals are, for example, in a frequency band between 0 and 4 kHz. They are either transmitted directly in this frequency band, or are modulated onto a carrier frequency and are demodulated upstream of the receiver, or are transmitted via a digital channel and are reconstructed upstream of the receiver. In each case, an analog received signal is produced at the receiver, in which the presence of individual signals at a different frequency must be detected.

Depending on the nature of the protection command, different requirements are in this case placed on the signal transmission and detection, and these can be characterized by the transmission time and bandwidth, and by the following parameters:

Puc Safety and/or security value, that is to say the probability that a command is received falsely owing to disturbances on the transmission path, even though it has not actually been transmitted. A low Pmc value corresponds to high transmission safety and/or security.

Pmc Reliability value, that is to say the probability that a command which has been transmitted is not received. A low Pmc value corresponds to high transmission reliability.

Disturbances in the transmission must not simulate any commands in a quiescent situation and, on the other hand when a command occurs, must not unacceptably delay a real command, or even lead to it being lost. High safety and/or security and high reliability with a short transmission time and a narrow bandwidth at the same time are contradictory requirements. However, one variable can always be improved at the expense of the other characteristics. The compromise is governed by the application. Thus, for example, indirectly tripping protection systems require short transmission times with high reliability and reasonable safety and/or security. Applications with direct switch tripping, on the other hand, demand very high safety and/or security and reliability, with the transmission time requirements being less stringent.

FIG. 1 shows, schematically, the transmission of protection commands between remote tripping devices: a transmitter 1 has a number of command inputs 1a, 1b, 1c as inputs for binary protection commands A, B, C. On the basis of the protection commands, the transmitter 1 produces analog signals, which are transmitted via the signal link 2. A receiver 3 receives the transmitted signals, reconstructs the appropriate values of the protection commands, and emits these via command outputs 3a, 3b, 3c. The signals, which code protection commands, are also referred to generically as command signals, in contrast to a guard signal or quiescent signal, as will be explained in the following text:

FIG. 2 shows a quiescent signal and a command signal in the frequency domain and in the time domain for transmission of a single signal at a first frequency, which signal corresponds to a protection command which is to be transmitted. An amplitude axis in the illustration is annotated Amp, a frequency axis is annotated f and a time axis is annotated t. In a quiescent situation, that is to say when no protection command need be transmitted, a quiescent signal or guard signal G is transmitted continuously at a second frequency. The receiver 3 detects the presence or the absence of the command signal A and of the quiescent signal G continuously and, if the signal quality is inadequate or if both are received together or neither of the two is received, produces an alarm signal. When a command occurs, the transmitting remote tripping device interrupts the quiescent signal and transmits a command signal. In FIG. 1, this occurs between the times t1 and t2. The command signal can be transmitted at a higher level than the quiescent signal G, generally at the maximum available output power. When the receiver identifies the lack of quiescent signal G and at the same time a valid command signal with a sufficient signal quality, then the command is regarded as having been identified, that is to say that it is real.

FIG. 3 shows the transmission of a number of protection commands using one command signal per protection command. A dedicated single-tone signal at a dedicated frequency is used for each command A, B, C, D. If it is intended to transmit a number of commands at the same time, the available transmission power is shared between the corresponding single-tone signals. FIG. 3 shows the simultaneous transmission of four protection commands, in which case only a quarter of the maximum signal amplitude, as shown by the dashed line, is thus available for each of the corresponding command signals. Although the receiver characteristics relating to the transmission time, safety and/or security and reliability can be set individually for each protection command, the signal-to-noise ratio is drastically worse than when transmitting only one command signal.

FIG. 4 shows transmission by means of one, and only one, command signal per protection command A, B, and for the protection command combination A&B as well. When a command occurs, the maximum transmission power at an individual frequency is in each case available, in order to produce the maximum possible signal-to-noise ratio in the receiver. However, bandwidth and further detectors are required for each protection command C that is additionally to be transmitted, and for its possible combinations with the other protection commands A&C, B&C, A&B&C.

FIG. 5 shows transmission by means of a combination of command signal for each protection command and for each protection command combination. Combinations of the command signals are transmitted at different frequencies F1 to F5 in order to transmit one or more protection commands. By way of example, two-tone signals are transmitted, each at half the signal amplitude. An individual protection command or a specific combination of protection commands is represented or coded by each of these frequency combinations.

The methods as shown in FIGS. 4 and 5 have the advantage that they can always operate with a sufficiently high signal-to-noise ratio. However, they also have the common feature that there is no capability to take account of different safety and/or security requirements for protection commands which have been transmitted as a command combination. The presence of a command combination must, for example, always be evaluated with the safety and/or security level of that individual command which has the most stringent safety and/or security requirement. Since high safety and/or security means a longer detection time, other individual commands in the command combination, whose safety and/or security requirements are less stringent but which will be transmitted more quickly for this purpose, are unnecessarily delayed.

SUMMARY OF THE INVENTION

The object of the invention is therefore to provide a method for reception of protection commands in a remote tripping device, and a remote tripping device of the type mentioned initially, which allow transmission of protection commands as command combinations as well, and nevertheless allow individual evaluation on the basis of different requirements for security and/or safety and for the time required for command detection.

This object is achieved by a method for reception of protection commands in a remote tripping device and by a remote tripping device having the features of patent claims 1 and 8.

In the method according to the invention for reception of protection commands in a remote tripping device, each signal is allocated a detector which detects the presence of the signal on the basis of at least two different safety and/or security threshold values which can be predetermined, and a protection command is detected with an associated minimum safety and/or security value if an individual signal, which codes the protection command individually or in conjunction with other protection commands, is detected with a safety and/or security threshold value which is greater than or equal to the minimum safety and/or security value allocated to that protection command, or if all the signals in a combination of signals which codes the protection command individually or in conjunction with other protection commands are in each detected with a safety and/or security threshold value which is greater than or equal to the minimum safety and/or security value allocated to the protection command.

On reception of an individual signal or a combination of signals which code a number of protection commands, it is thus possible to detect individual ones of this number of protection commands in accordance with different minimum safety and/or security values.

In one preferred embodiment of the subject matter of the invention, instead of different safety and/or security values, different transmission or detection times are used in the detectors for the signals. In a further preferred embodiment of the invention, the detection process is carried out on the basis of both different safety and/or security values and different transmission times. A protection command can thus always be transmitted optimally for the intended application, that is to say the parameters of safety and/or security, reliability and transmission time are individually configurable for the protection command.

The remote tripping device according to the invention has means for carrying out the method according to the invention.

Further preferred embodiments can be found in the dependent patent claims.

BRIEF DESCRIPTION OF THE DRAWINGS

The subject matter of the invention will be explained in more detail in the following text with reference to preferred exemplary embodiments which are illustrated in the attached drawings, in which:

FIG. 3 for transmission by means of in each case one command signal for each protection command;

FIG. 4 for transmission by means of in each case one command signal for each protection command and for each protection command combination;

FIG. 5 for transmission by means of a combination of command signals for each protection command and for each protection command combination;

FIG. 6 for transmission by means of alternating single-tone signals; and

The reference symbols used in the drawings and their meanings are listed in summary form in the list of reference symbols. In principle, identical parts are provided with the same reference symbols in the figures.

DETAILED DESCRIPTION OF THE INVENTION

Figure 5:
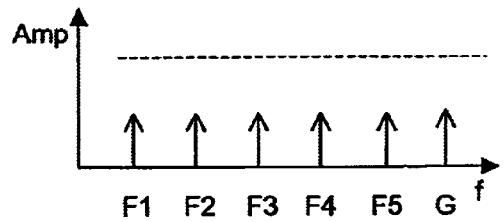
Figure 5:
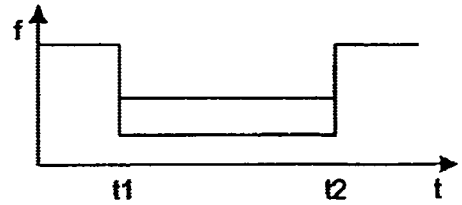

FIG. 5 shows transmission by means of a combination of command signals for each protection command and for each protection command combination. Combinations of the command signals are transmitted at different frequencies F1 to F5 in order to transmit one or more protection commands. In the following text, command signals are also referred to as signals. By way of example, two-tone signals are transmitted, each at half the signal amplitude. If the number of available signals is n, then $n*(n-1)/2$ combination options of two signals exist. A single protection command or a specific combination of protection commands is represented or coded by each of these combinations of signals. If the number of protection commands is m, the combination options are in this case calculated as follows: $2^m-1$. In order to allow all the protection commands to be transmitted with the available signals, $2^m-1<=n*(n-1)/2$. By way of example, the combination process is carried out in accordance with the following table. In this case, the first column shows all the possible individual protection commands, and the protection commands which occur in combination. The other columns show which two of a total of five signals are used for coding a single protection command or a combination of protection commands. Each of the signals is an essentially sinusoidal oscillation at a frequency $F1$, $F2$, ... $F5$.

| Protection commands to be transmitted | Transmitted signals or frequencies |  |  |  |  |
|---|---|---|---|---|---|
|  | F1 | F2 | F3 | F4 | F5 |
| A | X | X |  |  |  |
| B |  | X | X |  |  |
| C |  |  | X | X |  |
| A&B | X |  | X |  |  |
| B&C |  | X |  | X |  |
| A&C |  |  | X |  | X |
| A&B&C | X |  |  | X |  |

Figure 7:
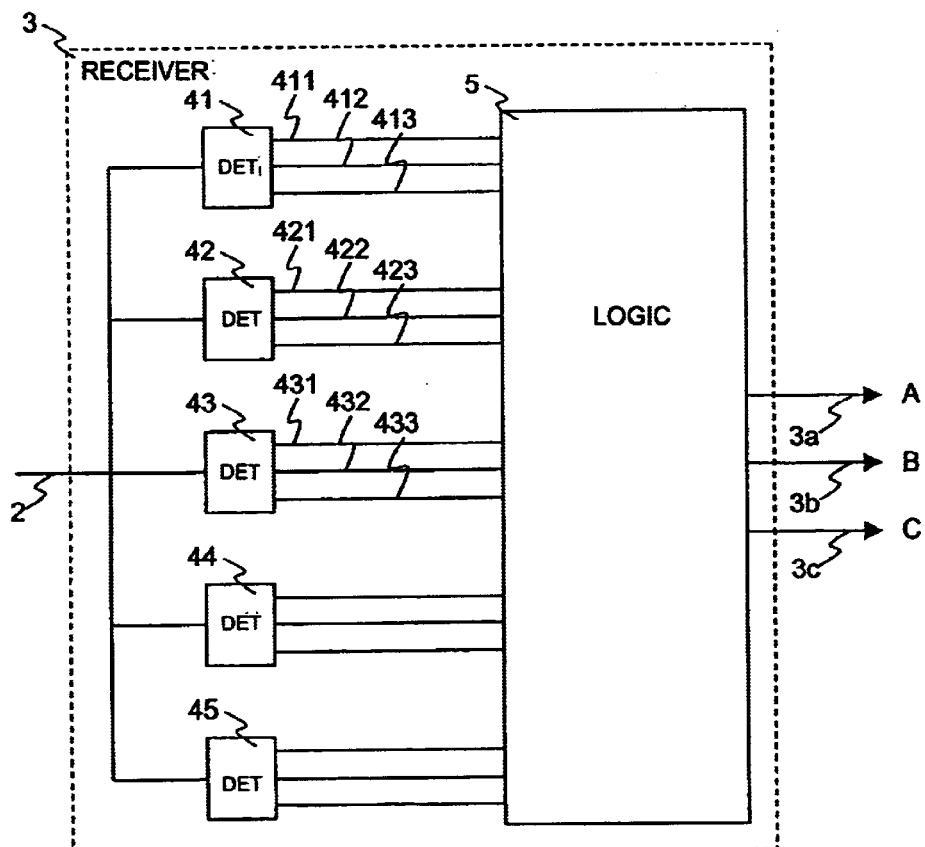
FIG. 7 shows a signal flow diagram for a receiver according to the invention.

FIG. 7 shows a signal flow diagram for a receiver according to the invention. In consequence, for example when receiving the command combination A&C, the detection of the protection command A—which has a relatively low level of safety and/or security but should be carried out as quickly as possible—is not delayed until the protection command C has been reliably detected. This is done in the following way: the receiver 3 has an associated signal detector 41 . . . 45 for each signal or each signal frequency. The principles of operation of such single-tone detectors are generally known, and two of them are stated in the following text:

In a first embodiment of the invention, a single-tone detector 41 . . . 45 such as this comprises a bandpass filter with a pass frequency corresponding to the signal to be detected, followed by a rectifier or detector for determining an envelope of the bandpass-filtered signal. The output of the rectifier or detector is low-pass filtered and is compared with a threshold value in a comparator. If the amplitude of the bandpass-filtered signal is sufficient, the output of the comparator indicates the detection of a signal. The transmission time or response time of the detector is equal to the inverse of the bandwidth of the bandpass filter.

In another embodiment of a single-tone detector 41 . . . 45, the received signal is correlated throughout a time window of constant length in a first correlator with a reference signal at the same frequency as the signal to be detected, and is correlated in a second correlator with the reference signal phase-shifted through 90°. The output signals from the two correlators are squared and are added to form a sum signal. This sum signal corresponds to a phase-independent component of the signal to be detected on the received signal, that is to say asynchronous demodulation. The sum signal is compared with a threshold value in a comparator. If the amplitude of the sum signal is adequate, the output of the comparator indicates the detection of a signal. The transmission time or signal evaluation time of the detector is equal to the length of the time window for both correlators.

In both of the embodiments described above, the signal which is compared with the threshold value corresponds to a measure of the safety and/or security with which the detected signal is actually present, or has been transmitted by the transmitter 1. This measure of the safety and/or security is referred to for short in the following text as the safety and/or security value. If the respective safety and/or security value at the signal detectors 41, 42, 43 exceeds a first threshold value L, then this is indicated at first detector outputs 411, 421, 431. If the respective safety and/or security value exceeds a second, higher threshold value M, then this is indicated at second detector outputs 412, 422, 432. If the respective safety and/or security value exceeds a third, even higher threshold value H, then this is indicated at third detector outputs 413, 423, 433. The values at the detector outputs are used in linking logic 5 to form values of command outputs 3a, 3b, 3c, which, when appropriate, signal detection of the protection commands A, B, C.

Since each detector has a number of outputs corresponding to different safety and/or security threshold values, the detection of a protection command which has been transmitted in conjunction with other protection commands or by a combination of signals can be carried out selectively in accordance with the safety and/or security level required for that protection command. This is done, for example, in accordance with the following table. With regard to the invention, the first column also indicates that a low minimum safety and/or security value L is predetermined for the transmission or for reception for the protection command A, a medium level M is predetermined for the protection command B, and a high minimum safety and/or security value H is predetermined for the protection command C.

| Protection commands to be transmitted | 1st Det. (F1) | | | 2nd Det. (F2) | | | 3rd Det. (F3) | | | 4th Det. (F4) | | | 5th Det. (F5) | | |
|---|---|---|---|---|---|---|---|---|---|---|---|---|---|---|---|
|  | L | M | H | L | M | H | L | M | H | L | M | H | L | M | H |
| A (L) | A |  |  | A |  |  |  |  |  |  |  |  |  |  |  |
| B (M) |  |  |  |  | B |  |  | B |  |  |  |  |  |  |  |
| C (H) |  |  |  |  |  |  |  |  | C |  |  | C |  |  |  |
| A&B | A | B |  |  |  |  | A | B |  |  |  |  |  |  |  |
| B&C |  |  |  |  | B | C |  |  |  |  | B | C |  |  |  |
| A&C |  |  |  |  |  |  | A |  | C |  |  |  | A |  | C |
| A&B&C | A | B | C |  |  |  |  |  |  | A | B | C |  |  |  |

The table should be read as follows: Protection command A on its own is coded by in each case one signal at the frequency F1 and one at the frequency F2. Since only a low minimum safety and/or security value is required for A, A is already detected and is emitted via the command output 3a, provided that the corresponding signal is detected with a safety and/or security level which is higher than the first (lowest) threshold value L, both in the first detector 41 for the frequency F1 and in the second detector 42 for the frequency F2.

The protection command A in conjunction with the protection command B is coded by in each case one signal at the frequency F1 and one at the frequency F3. The presence of A is detected and is emitted as soon as the corresponding signal is detected with a safety and/or security level which is higher than the first threshold value L both in the first detector 41 and in the third detector 43 of the frequency F3. In contrast, the presence of B is detected only when the corresponding signal is detected with a safety and/or security level which is higher than the second threshold value M both in the first detector 41 and in the third detector 43.

The combined transmission of all the protection commands together with one another (A&B&C) leads to first of all A, then B and finally C being regarded as having been detected, as the safety and/or security level of response increases both in the first detector 41 and in the fourth detector 44.

The requirements for the detection of the other protection commands and of their combinations can be found in an analogous manner from the table. The table thus defines the linking logic 5. For example, the protection command C is regarded as having been detected when the third and the fourth, or the second and the fourth, or the third and the fifth, or the first and the fourth detectors each respond with the maximum safety and/or security level H.

If a high degree of safety and/or security H is, for example, also required for the protection command B, then the table is as follows:

| Protection commands to be transmitted | 1st Det. (F1) | | | 2nd Det. (F2) | | | 3rd Det. (F3) | | | 4th Det. (F4) | | | 5th Det. (F5) | | |
|---|---|---|---|---|---|---|---|---|---|---|---|---|---|---|---|
| | L | M | H | L | M | H | L | M | H | L | M | H | L | M | H |
| A (L) | A | | | A | | | | | | | | | | | |
| B (H) | | | | | | | | | B | | | B | | | |
| C (H) | | | | | | | | | C | | | C | | | |
| A&B | A | | B | | | | | A | B | | | | | | |
| B&C | | | | | | | B, C | | | | | B, C | | | |
| A&C | | | | | | | A | | C | | | | A | | C |
| A&B&C | A | B, C | | | | | | A | | | | B, C | | | |

The method according to the invention can be used in an analogous manner for configurations with only two or with more than three safety and/or security threshold values, in the same way as when less than or more than three protection commands are present.

Figure 1:
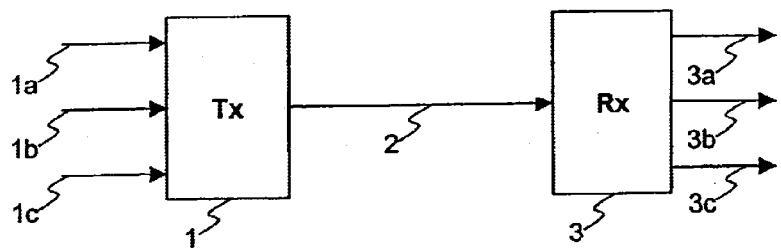
FIG. 1 shows, schematically, the transmission of protection commands between remote tripping devices.
Figure 2:
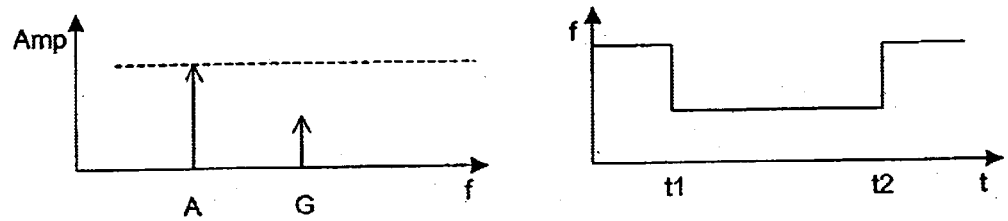
FIGS. 2 to 6 show quiescent signals and command signals in the frequency domain and in the time domain, to be precise FIG. 2 for transmission of a single command signal.
Figure 3:
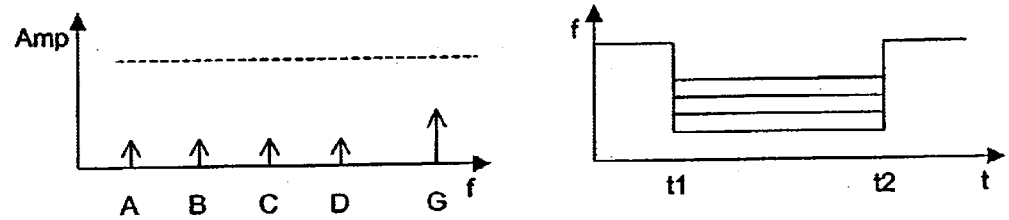
Figure 4:
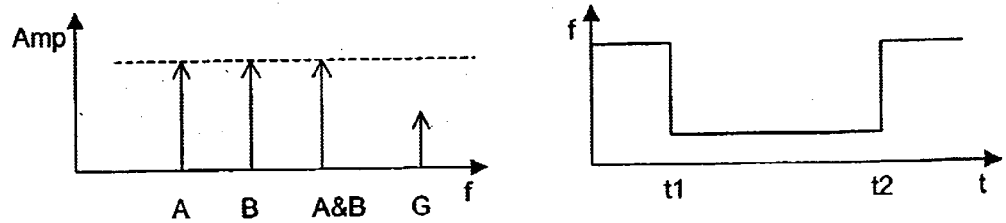

In another preferred embodiment, the invention is used in conjunction with coding as shown in FIG. 4. Thus, in the case of a single-tone signal which codes a combination of protection commands, the presence of individual ones of these protection commands is detected on the basis of different safety and/or security threshold values.

Figure 6:
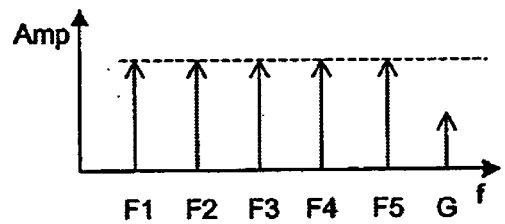
Figure 6:
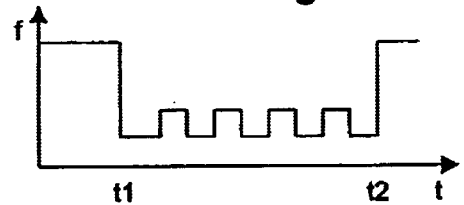

FIG. 6 shows transmission by means of alternating single-tone signals, as is used in a further preferred embodiment of the invention. A single protection command or a combination of protection commands is in this case coded by means of alternating single-tone signals. By way of example, periodic switching takes place between F1 and F2 for the protection command A, and between F1 and F3 for the combination A&B. In the sense of the previously used terminology, a signal such as this at periodically changing frequencies is regarded as a "signal" which is detected by a suitable detector having a number of safety and/or security threshold values. The formation of the values of the command outputs 3a, 3b, 3c corresponding to the detector outputs 411, 412, 413, 421, 422, . . . is carried out as already described. In a further embodiment for the detection of alternating single-tone signals, single-tone signals are each detected by dedicated detectors, and the switching operations between the two single-tone signals are processed in an appropriately upgraded linking logic 5.

Those elements of the receiver 3 which provide the signal flow as shown in FIG. 7 are preferably formed by an appropriately programmed data processing unit or application-specific integrated circuits (ASICs, FPGAs). However, they can also be implemented by analog components and/or in conjunction with discrete logic elements and/or programmed circuits. In one preferred embodiment of the invention, the receiver 3 is in the form of an appropriately programmed digital signal processor.

A computer program for reception of protection signals in a remote tripping device according to the invention can be loaded in an internal memory of a digital data processing unit and has computer program code means which, if they are in the form of a digital data processing unit, cause this digital data processing unit to carry out the method according to the invention. In one preferred embodiment of the invention, a computer program product has a computer-legible medium in which the computer program code means are stored.

List of Reference Symbols

Amp Amplitude
f Frequency
t Time axis
A,B,C,D Protection commands
G Guard signal, quiescent signal
1 Transmitter
1a,1b,1c Command inputs
2 Signal link
3 Receiver
3a,3b,3c Command outputs
41,42,43,44,45 Signal detectors
411,421,431 First detector outputs
412,422,432 Second detector outputs
413,423,433 Third detector outputs
5 Linking logic

What is claimed is:

1. A method for reception of protection commands in a remote tripping device, in which
one or more signals are received,
protection commands and combinations of protection commands are coded by means of an individual signal or by means of a predetermined combination of signals, and
each protection command is allocated a predetermined minimum safety and/or security value,
wherein each signal is allocated a detector which detects the presence of the signal on the basis of at least two different safety and/or security threshold values which can be predetermined, and wherein a protection command is detected
- if an individual signal, which codes the protection command individually or in conjunction with other protection commands, is detected with a safety and/or security threshold value which is greater than or equal to the minimum safety and/or security value allocated to the protection command, or
- if all the signals in the predetermined combination of signals which codes the protection command individually or in conjunction with other protection commands are each detected with a safety and/or security threshold value which is greater than or equal to the minimum safety and/or security value allocated to the protection command.

2. The method as claimed in claim 1, wherein each of the signals is formed by an oscillation at a predetermined frequency.

3. The method as claimed in claim 1, wherein each protection command and each combination of protection commands are coded by means of one, and only one, signal.

4. The method as claimed in claim 1, wherein each protection command and each combination of protection commands are coded by means of two, and only two, signals.

5. The method as claimed in claim 1, wherein each of the signals is formed by an oscillation which switches periodically between two predetermined frequencies.

6. The method as claimed in claim 1, wherein values for a transmission time of the signals or of the protection commands are used instead of safety and/or security values for a detection of the signals or protection commands.

7. The method as claimed in claim 1, wherein both safety and security values for a detection of the signals or protection commands and values for a transmission time of the signals or protection commands are used.

8. A remote tripping device, having means for reception of one or more signals, with protection commands and combinations of protection commands being coded by means of an individual signal or by means of a predetermined combination of signals, and each protection command being allocated a predetermined minimum safety and/or security value,
- wherein the remote tripping device has at least one detector, with each signal being allocated a detector for detection of the presence of the signal on the basis of at least two different safety and/or security threshold values which can be predetermined, and
- wherein the remote tripping device has a means for detection of the presence of a protection command,
- if an individual signal, which codes the protection command individually or in conjunction with other protection commands, is detected with a safety and/or security threshold value which is greater than or equal to the minimum safety and/or security value allocated to that protection command, or
- if all the signals in the predetermined combination of signals which codes the protection command individually or in conjunction with other protection commands are each detected with a safety and/or security threshold value which is greater than or equal to the minimum safety and/or security value allocated to the protection command.

* * * * *